G. W. SWARTZ.
ENGINE.
APPLICATION FILED OCT. 21, 1916.

1,351,544. Patented Aug. 31, 1920.
8 SHEETS—SHEET 1.

Inventor
George W. Swartz
La Porte & Brau.
attys

G. W. SWARTZ.
ENGINE.
APPLICATION FILED OCT. 21, 1916.

1,351,544.

Patented Aug. 31, 1920.
8 SHEETS—SHEET 6.

INVENTOR
George W. Swartz
By LaPate & Brown
Attys.

G. W. SWARTZ.
ENGINE.
APPLICATION FILED OCT. 21, 1916.

1,351,544.

Patented Aug. 31, 1920.
8 SHEETS—SHEET 7.

G. W. SWARTZ.
ENGINE.
APPLICATION FILED OCT. 21, 1916.

1,351,544.

Patented Aug. 31, 1920.
8 SHEETS—SHEET 8.

Inventor:
George W. Swartz
La Pute & Bean
Attys

UNITED STATES PATENT OFFICE.

GEORGE W. SWARTZ, OF PEORIA, ILLINOIS.

ENGINE.

1,351,544.   Specification of Letters Patent.   Patented Aug. 31, 1920.

Application filed October 21, 1916. Serial No. 126,858.

*To all whom it may concern:*

Be it known that I, GEORGE W. SWARTZ, a citizen of the United States, and resident of Peoria, county of Peoria, and State of Illinois, have invented a new and useful Improvement in Engines, of which the following is a specification.

My invention relates to improvements in engines and particularly internal combustion engines and the principal object is the attainment of greater efficiency.

Another object of my invention is the provision of an engine of this type in which the temperature is maintained practically uniformly throughout and at the highest possible point, the maximum part of the heat generated being utilized in the production of power.

A further object of this invention is the provision of a structure wherein the heat generated by the combustion of the fuel and the heat of the exhaust gases is utilized to raise the temperature of a body of water which is introduced into the engine in the form of hot water or steam, so that the power strokes of the piston are alternately fuel and steam imparted.

Another object of this invention is the provision of an internal combustion engine which utilizes a hydrocarbon fuel or the like for alternate power strokes, the heat generated by the combustion of the fuel being utilized to raise the temperature of a body of water, this hot water being injected into the cylinder at every alternate power stroke, and expanding or exploding into steam to give impetus to the piston, this arrangement also preventing the deposit of scale carbon or other solid matter on the piston head or in the combustion chamber, and also maintaining all parts of the engine which are exposed to the heat of the fuel at the highest practical constant temperature.

Heretofore, in internal combustion engines, using fuel of hydrocarbon or the like, means is provided, usually in the form of a water jacket or the like, or in the form of air cooling, for absorbing, carrying away and radiating the excess heat, generated by the combustion of the fuel, and this heat is wasted without any use being made of its energy. This naturally results in low efficiency and wasteful fuel consumption, and in view of this condition, I have evolved the construction disclosed in this application, which is designed on the following principle.

In the form disclosed, I use a reciprocating type of motor, including the usual water-jacketed cylinder, piston, crank-shaft, cam-shaft, and inclosed crankcase, air-tight joints being provided at the bearings of the shafts. I also use a water heater or boiler through which the exhaust gases are conducted, water circulating through the jacket and heater automatically on the thermosiphon system and the quantity of water in the boiler and system being automatically controlled by a water pump and controlling float, so as to prevent sudden cooling of the water. The engine drives an air compressor to maintain a suitable supply of air under pressure in a tank or other receiver (not shown). Injectors are provided for injecting the fuel and the hot water into the cylinder, these injectors being suitably controlled and timed so as to admit a charge of fuel and a charge of hot water on the alternate power strokes of the piston, air being supplied thereto under pressure so as to atomize the fuel and water and to force the same into the cylinder under pressure, the amount of hot water admitted being controlled by a thermostat and the amount of fuel by a governor mounted on the cam-shaft or other suitable place. Cams on the cam-shaft operate suitable valves for controlling the admission and exhaust of the fuel, hot water, steam and hot gases to and from the cylinder. The cylinder is provided with an air jacket having ports leading thereinto and controlled by a valve so that at suitable intervals charges of air are admitted into the cylinder to assist in clearing out the exhaust gases and to form a charge for compression previous to ignition.

To the accomplishment of the foregoing and such other objects as may hereinafter appear, my invention consists in the construction, combination and arrangement of parts hereinafter described and then sought to be defined in the claims, reference being had to the accompanying drawings forming a part hereof, and in which is shown a preferred embodiment of my invention merely for the purpose of illustrative disclosure, it being expressly understood that various changes may be made in practice within the scope of the claims without digressing from my inventive idea.

Figure 1 is a side elevation of one form of construction embodying my invention, parts being shown in section to facilitate disclosure;

Figs. 6 and 7 are detail views of the thermostatic control of water injection;

Referring now to the drawings, and at first merely generally, the reference character A designates the water heater or boiler, which is preferably of the fire tube type, B the crank case connected to cylinder C in which piston D reciprocates, and having water jacket E to receive water from the boiler and discharge it to the tank F. G designates an air compressor and H an automatic valve to control the admission of air into the crank case and into passage-way between the crank-case and the cylinder. This valve may be positively and mechanically operated. Thermostat K and the centrifugal governor control the quantity of air passing through the fuel and hot water injector L and L' and consequently the pressure of the air under which the fuel and hot water is injected. Pump M supplies the system with water, which is preferably admitted at the bottom of the boiler, the pump being operated continuously to supply a small quantity of water, a float being provided in the tank to regulate the quantity automatically. While I have shown these parts in a particular arrangement, it is to be expressly understood, that this embodiment of my invention is merely illustrative and that I am not to be restricted thereto by construction. The unitary construction of the plant is adapted merely for convenience.

The numeral 1 designates the crank shaft having the usual connecting rod 2 to the piston. The crank shaft is mounted in suitable bearings 3 in the crank case having the air-tight joints, the detailed construction of which will be described later, and may have fly-wheels 4 on either end thereof. It is to be understood that the crank case and cylinder are air tight in construction with suitable ports in the cylinder for the inlet and exhaust of fuel, hot water and air thereto and therefrom. The crank shaft has eccentric 5 secured thereto for operating the air compressor G, which is of any standard form, having the connection 6 to a suitable air tank or receiver, not shown.

Figures 2, 3:
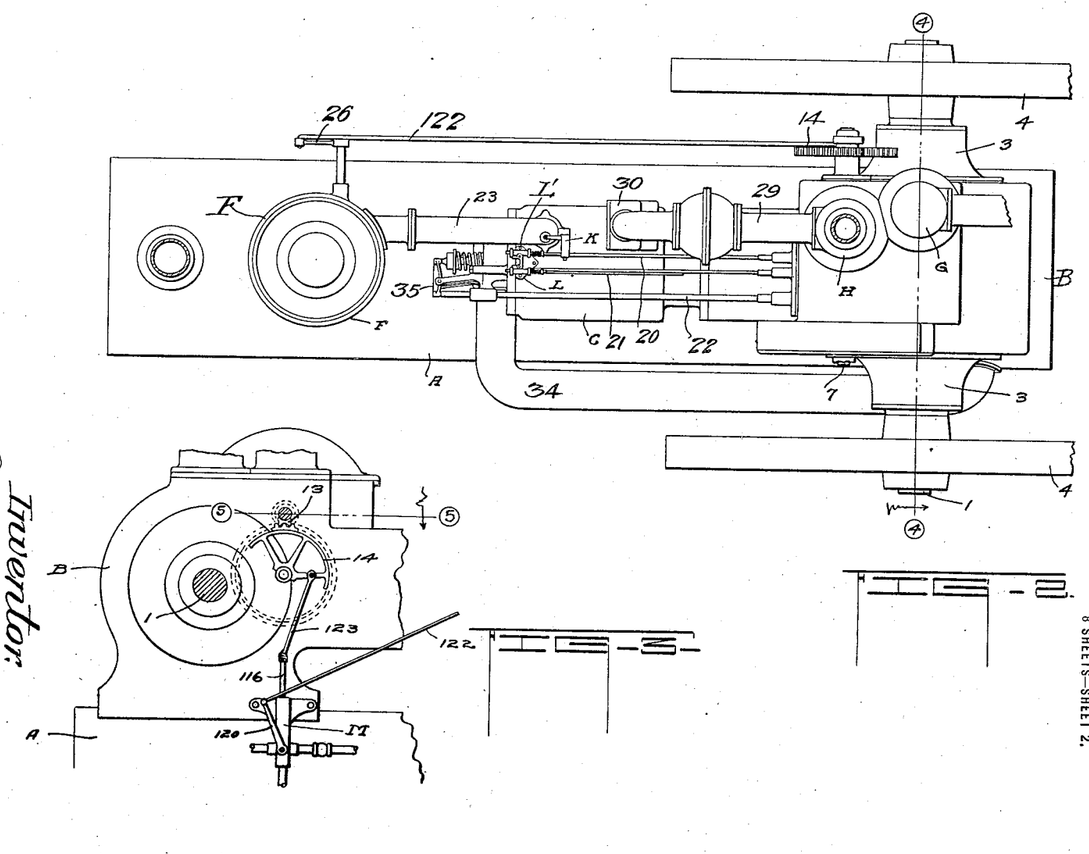
Fig. 2 is a top plan view of the construction shown in Fig. 1.
Fig. 3 is an elevation of part of the crank-case and cylinder, showing the water pump and connections for driving the same.
Figure 4:
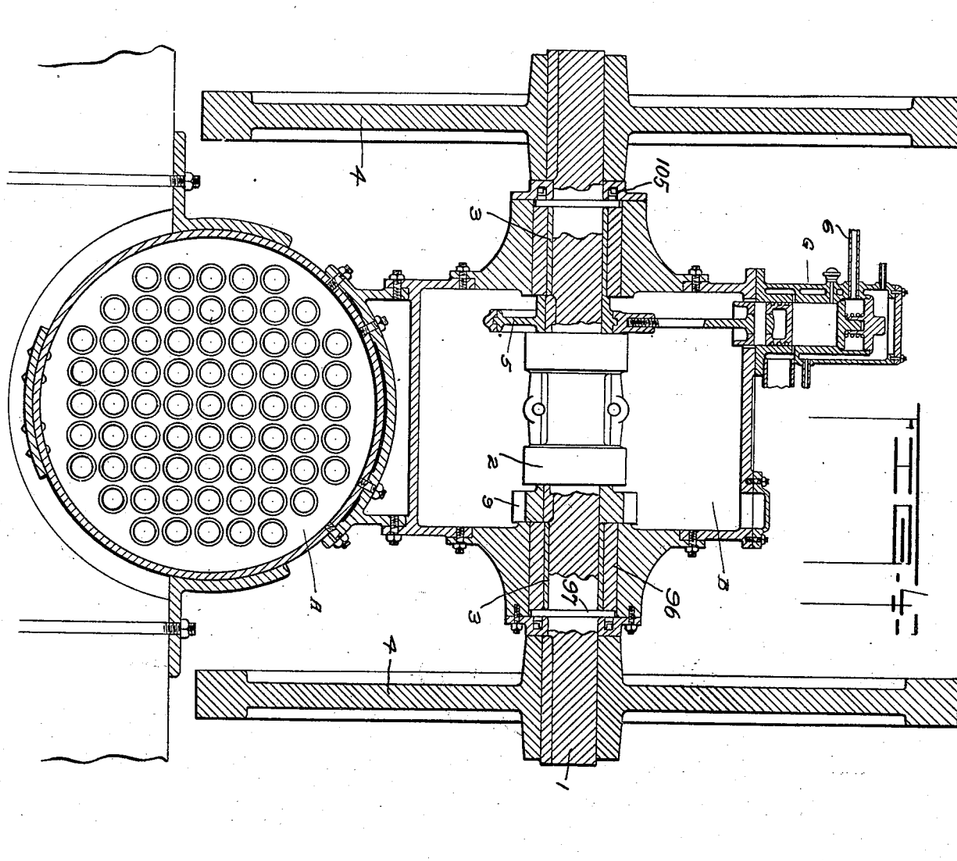
Fig. 4 is a vertical cross-section through the crank-case and boiler, taken substantially on line 4—4 of Fig. 2.

The cam shaft 7 is journaled in bearings in the crank case above the crank shaft, the joint being made air-tight by the packings 8, the detailed description of which will be made hereafter, as shown particularly in Fig. 1, and is driven by means of gears 9 and 10 at one-half the speed of the crank-shaft. On one end of this cam shaft, preferably outside of the crank-case, I provide the centrifugal governor 11, (Fig. 5), for controlling lever 12, which regulates the amount of fuel admitted to the cylinder, as will presently be described. On the other end of the cam shaft, I secure pinion 13 for driving gear 14, which actuates the water pump M (Fig. 3).

Mounted on the cam shaft are a plurality of cams 15, 16, 17 and 18, the latter being a double cam, these cams each actuating one of a series or plurality of push rods 19, 20, 21 and 22, which pass through suitable bushings in the front end of the crank case and extend horizontally over the cylinder.

As stated hereinbefore, cylinder C is provided with a water jacket E, which extends for a major portion of the length thereof, having the discharge connection 23 with the tank F and the supply connection 24 from boiler A. The level of the water in the system and tank F is controlled by float 25, having the lever and link connection 26 with water pump M, (Figs. 1, 2, 3, 13 and 14, so that when the supply of water in the system reaches a predetermined high level, the float operates a valve in the pump so as to control the supply of water to the bottom of the boiler, as will be described more at length hereinafter. The other part of the cylinder is formed or provided with the air jacket or compartment 27, having the plurality of ports or openings 28 leading into the cylinder at an intermediate point, and being arranged circumferentially around the cylinder in position to be uncovered by the piston near the end of its instroke.

The automatic air valve H has a connection 29 leading to a partitioned compartment 30 having the suitable valve 31 mounted therein and operated by cam 19 on the cam shaft to control and time the admission of air into the cylinder through the jacket 27 and ports 28. It is to be noted that connection 29 is adapted to receive a carbureter, where gas is used as fuel and the fuel injector is not used or carbureter or mixer may be placed between crank-case and the atmosphere.

The cylinder C also has the exhaust valve opening 32 in its head with valve 33 to control the passage of the exhaust gases and steam to the boiler by means of pipe or connection 34. This exhaust valve is operated by means of double cam 18 on the cam shaft through push rod 22 and lever 35 (Fig. 1).

Figure 11:
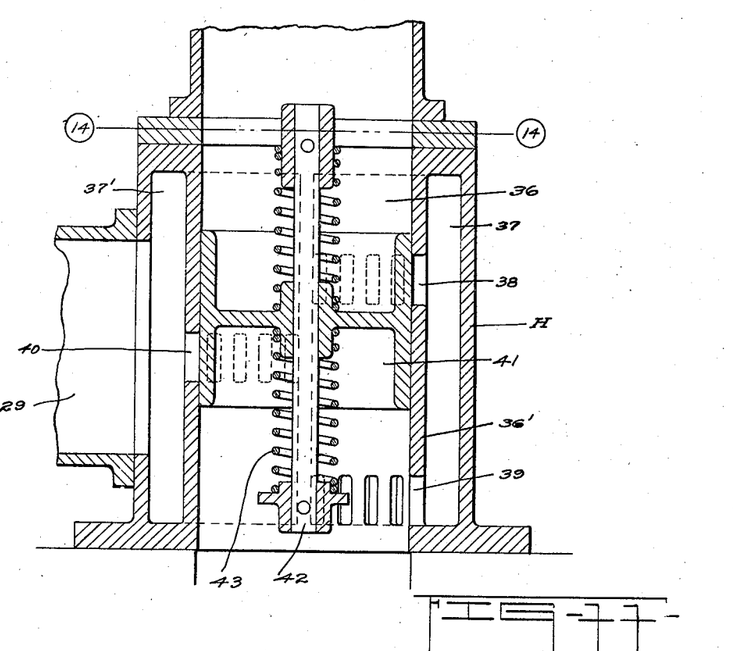
Fig. 11 is a vertical section of the automatic valve.
Figure 12:
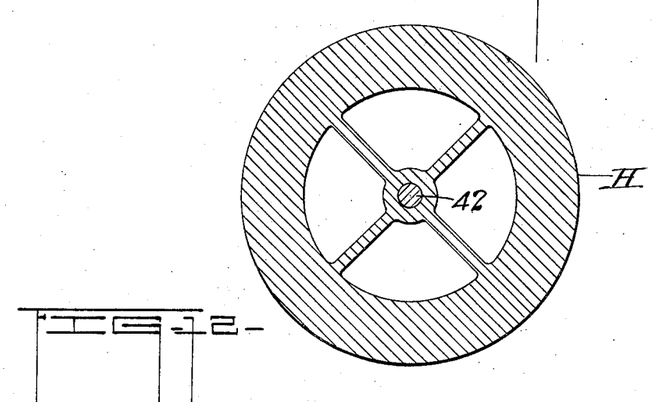
Fig. 12 is a horizontal section on line 14—14 of Fig. 11.

The automatic air valve H shown in detail in Figs. 11 and 12, includes the cylinder 36, double walled and partitioned as at 36' to provide compartments 37 and 37', having a series of ports 38 and 39 extending half way around the cylinder and leading into the upper and lower portions of compartment 37 and another series of ports 40 extending half way around the cylinder and leading into compartment 37' at an intermediate point. The air pipe or connection 29 communicates with compartment 37' as shown. The piston or valve proper 41 is slidably mounted on shaft or rod 42, being practically balanced and normally held in the position shown by the springs 43 on each side thereof, the sides of the piston or valve being of sufficient size to close two of the series of ports on opposite sides of the cylinder at one time, so as to properly control the admission of the charges of air to and from the crank case and to the air pipe or connection 29.

The operation of the mechanism previously described will now be explained. It is understood that the crank case end of the piston operates as an air pump, drawing in and discharging air at each reciprocation of the piston. In starting the crank shaft may be revolved or turned over manually or by any suitable mechanical means, as is well understood. The first outstroke of the piston forms a partial vacuum in the crank case and permits the atmospheric pressure of the air on the balanced valve or piston 41 of the automatic air valve H to force the valve or piston downwardly and permit a quantity of air to pass through ports 38 into compartments 37 and thence through ports 39 into the crank case. The following instroke of the piston compresses the air in the crank case so that the valve or piston 41 is moved outwardly against the atmospheric pressure, and forcing a quantity of air through ports 40 into compartment 37' and thence into pipe connection 29 and compartment 30. This pipe or passageway 29 is of sufficient area to prevent excessive compression of air and the consequent heating thereof. The subsequent reciprocations of the piston repeat this process, but just before the cylinder end of the piston uncovers the series of air inlet ports 28 in the cylinder on its instroke, the intake valve 31 is opened to admit the double charge of air contained in the pipe or passage 29 and compartment 30 to the cylinder, in which it is compressed by the outmoving piston. At or about the end of this outstroke, hydrocarbon fuel is supplied to the cylinder through injector L, and ignited and burned, the expanding gases giving an impulse to the piston. Just before the piston uncovers air inlet ports 28 on its instroke, the exhaust valve 33 is opened, reducing the pressure in the cylinder so as not to force valve 31 open, and the piston on its returning outstroke expels the hot gases and products of combustion through pipe connection 34 to the boiler. At or near the end of this outstroke, the exhaust valve closes and a spray of hot water from the boiler or water system is introduced into the cylinder through injector L, which instantaneously expands or explodes into steam, giving another power impulse to the piston. This hot water and steam tends to cool the piston head and cylinder walls, and also prevents the formation and deposit of scale, carbon and other solid matter in the combustion chamber and on the piston head.

On this power or instroke of the piston, the exhaust valve is again opened just before the air inlet ports 28 are uncovered by the piston, the exhaust valve only remaining open until the piston covers or nearly covers the air inlet ports on its outstroke, so that a double charge of air rushes into the cylinder in front of the piston head, it being understood that inlet valve 31 is open. Part of this double charge of air expels the residue of water vapor remaining in the cylinder, the remainder of the air being compressed by the outstroke of the piston after the closing of the exhaust valve. This completes the cycle of operation.

Figure 8:
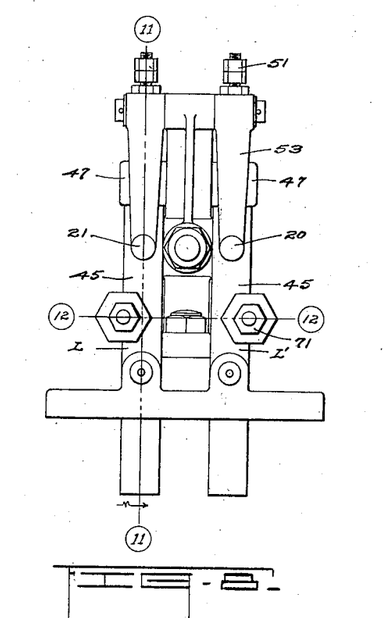
Fig. 8 is an elevation of a form of injector adapted for use with this invention.
Figure 9:
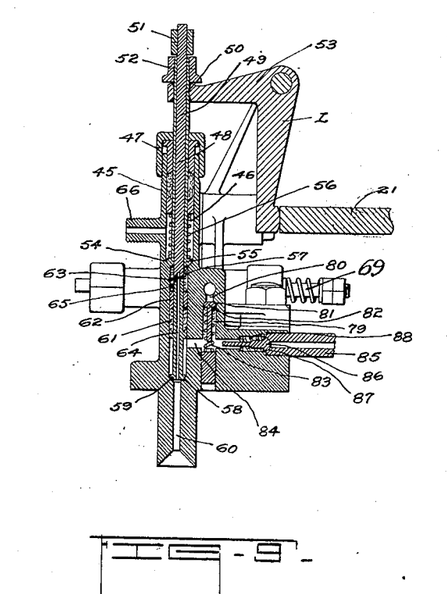
Fig. 9 is a vertical cross-section on line 11—11 of Fig. 8.
Figure 10:
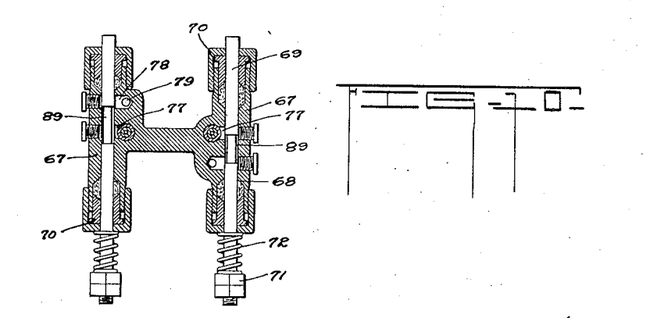
Fig. 10 is a horizontal cross-section on line 12—12 of Fig. 8.

I will now proceed to the detailed description of the various accessory devices, which form part of the invention, and which have heretofore been referred to in general terms only, and will direct attention first to Figs. 8, 9 and 10 of the drawings, showing the injector for supplying fuel and hot water to the cylinder. While I have shown this as an integral construction, it is to be expressly understood that the injectors for fuel and hot water may be made and mounted separately, if desired.

These injectors are substantially the same in construction, L designating the fuel injector, and L' the hot water injector. Each one has the vertical barrel 45 with an enlarged bore or compartment 46 in its upper portion closed by stuffing-box cap 47 through which the double valve stem 48 passes. This double valve stem includes the rod 49 and the sleeve 50, within which rod 49 is positioned, the rod having the extremital nuts 51 to form a stop to be engaged by the end of the sleeve 50 or the nuts 52 on the end thereof in its upward movement, which is caused by bell-crank lever 53 engaged by one of the push rods 20 or 21. It is to be noted that the sleeve 50 has a slight initial independent movement on the rod 49 before the nuts 51 on the end thereof are engaged to move it.

At the lower end of the enlarged bore or compartment 46, I provide a valve seat 54 to receive a valve 55 on the lower end of sleeve 50, spring 56 engaging the valve 55 and the stuffing box to hold the parts normally in the position shown, with valve 55 on its seat 54. The intermediate portion 57 of the bore is reduced or less in diameter than bore or compartment 46, forming a smaller compartment and having a valve seat 58 at its lower end to receive valve 59 on the end of rod 49, which as shown extends through and is longer than sleeve 50. This restricted bore or compartment 57 communicates with the still further restricted bore or discharge opening 60 when the valve 59 is off its seat 58. The rod 49 is provided with a suitable packing 61 for the intermediate bore or compartment, sleeve 62 holding it in place and forming a shoulder on which the lower end of spring 63 rests, this spring embracing an intermediate part of rod 49 and engaging the underside of valve 55. Spring 56 is stronger than spring 63 so as to normally hold valve 55 on its seat against the pressure of spring 63.

The lower part of rod 49 is provided with the passage 64 having ports 65 at its upper end communicating with the restricted bore or intermediate compartment 57 between valve 55 and sleeve 62 and leading into the upper portion of said compartment. A connection 66 is provided communicating with the enlarged bore 49 and adapted to receive air from the tank or receiver (not shown) previously referred to.

Figure 5:
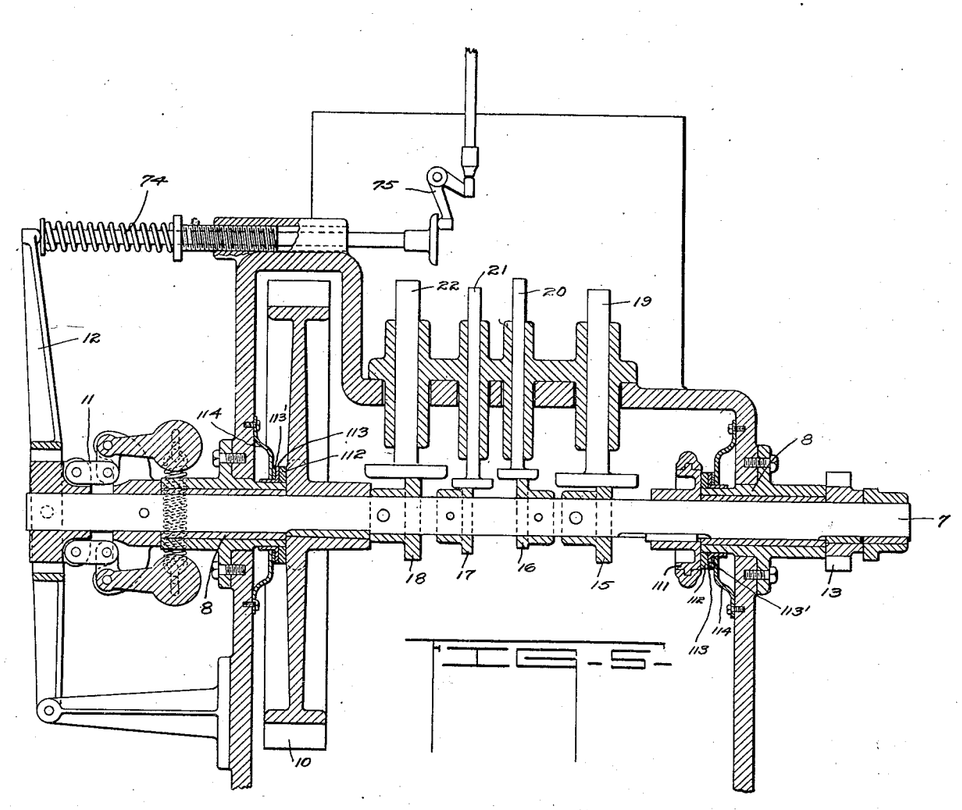
Fig. 5 is a horizontal section through the crank-case taken substantially on line 5—5 of Fig. 3 showing the cam-shaft and related part.

Each injector has the horizontal barrel 67, shown best in Fig. 10, each of which has the bore 68, valve rod 69, stuffing boxes 70 on each end, one end of the rod having adjusting nuts 71 and spring 72 for holding each valve rod 69 in the normal position shown. The end of the rod 69 of the hot water injector is engaged and moved by a connection 73 from the thermostat K, while the end of the rod 69 of the fuel injector is engaged by a connection from the centrifugal governor 11, this last mentioned connection including spring held push rod 74 engaged by lever 12, bell crank lever 75 and push rod 76 (Fig. 5). Bore 68 communicates by means of a horizontal passage 77 with the intermediate bore or compartment 57 of the vertical barrel and also communicates by means of the horizontal passage 78 with the vertical bore 79, this being restricted as at 80 to form valve seat 81 for valve 82 which is held in position by means of spring 83. This vertical bore or passage 79 communicates with another horizontal passage 84 in the lower part of the casting, which leads into the intermediate bore or compartment 57 of the vertical barrel below the packing 61. This horizontal passage 84 extends in the opposite direction to a pipe connection 85 for hydrocarbon or water supply as the case may be, being normally open. Valve 86 is adapted to engage seat 87 and is forced in that direction by spring 88, but the pressure of the fuel or hot water is sufficient to keep valve 86 open until air is admitted into vertical bore or passage 79, as will be described presently, the pressure of the air assisted by the spring 88 being sufficient to force valve 86 onto its seat. Each valve rod 69 is provided with a reduced intermediate portion 89 to establish communication between the intermediate bore or compartment 57 of the vertical barrel above the packing ring with the vertical bore or passage 79.

The operation of the injector is as follows and it is to be understood that the description refers to the water injector only, this being the one on the right in Figs. 8 and 10 and operated by cam 16. When the cam 16 through its push rod 20 actuates bell crank 53, sleeve 49 is first lifted, raising valve 55 off its seat and permitting air under pressure to pass from connection 66 through bore or compartment 46, valve 55 to intermediate bore or compartment 57, through ports 65, passage 64 and passage 60, so that a stream of air is flowing through the restricted outlet passage 60. Air also passes through horizontal passage 77, reduced portion 89 of valve rod 69 to the horizontal passage 78 and vertical passage 79. When, immediately afterward, the rod 49 is lifted, valve 59 is raised off its seat, permitting air to rush from vertical passage 79 through horizontal passage 84 into the restricted discharge opening 60, carrying water above boiling point and under pressure with it and forcing valve 86 shut. The compressed air entering through vertical passage 79 and also vertical passage 64 in the rod 49 atomizes the water and forces it into the cylinder under high pressure, where it expands or rather explodes into steam, due to the immediate and marked decrease in pressure. The position of the valve rod 69 is determined by the thermostat K, so that the amount of air passing through the reduced portion 89 of the valve rod 69 is regulated and this obviously, controls the amount of water passing through valve 86 and forced into the cylinder. In the hydrocarbon injector, the position of the valve rod 69 is determined by the governor 11 on the cam shaft and the amount of fuel admitted depends on the speed of the motor and the load being carried.

Figure 7:
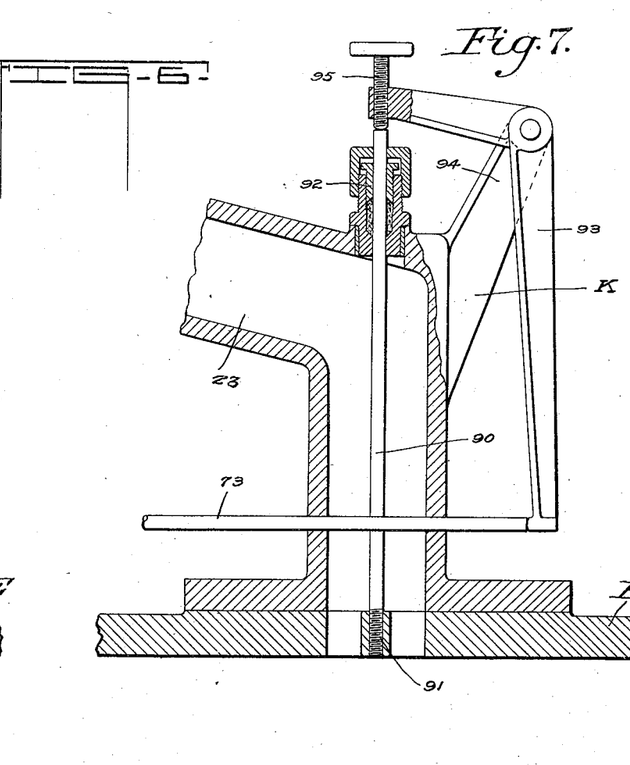

The thermostat K shown in detail in Figs. 6 and 7 of the drawings, may be mounted in any position where it will be affected by the heat of the motor, as in the exhaust pipe, combustion chamber or in the water system. I show it mounted in the pipe 23 between tank F and the cylinder and it includes the rod 90 of brass, copper or any suitable material sensitive to heat, this rod being screwed into socket 91 at its lower end and passing through a stuffing box 92 in pipe 23. Bell crank lever 93 is pivotally mounted on bracket arm 94, one end engaging the end of push rod 73 and the other end being provided with adjusting screw 95 engaging the end of rod 90, so that its expansion and contraction will change the position of lever 93 and consequently the valve rod 69 in the injector.

It will therefore be readily understood that the centrifugal governor will control the quantity of fuel required to maintain a given load and on fluctuation of the load the governor admits more or less fuel. For example, when the load is increased, more fuel is burned, more heat is generated and communicated to the thermostat K, which regulates valve rod 69 in the injector L' to admit more water giving increased steam pressure. This causes the centrifugal governor to reduce the amount of fuel in the subsequent charges until an equilibrium is established.

It is well to mention the fact that the steam will absorb heat from the cylinder walls and piston head, thus raising its pressure and keeping the temperature of the interior of the cylinder practically uniform with that of the jacket water. The higher the temperature at which an engine can be safely operated, the greater its efficiency and with this invention and apparatus, an operating temperature may be predetermined which will only be limited by the ability of the lubricant to withstand the heat. The water valve rod 69 which is controlled by the thermostat K is regulated so that a small quantity of water will always be injected into the cylinder, even when starting the engine cold. Also by this construction and method of operation, it is impossible for any part of the piston head to become excessively hot regardless of the diameter of the same, and it is therefore unnecessary to water cool the piston, as is done in certain engines having pistons of large diameter.

I disclose a modified form of air tight bearing ring in connection with the cam shaft, as shown in Fig. 5. The eccentric 111 may be used for driving an oil pump or any other desired purpose. Against this eccentric I mount the metallic packing ring 112 with the cup leather washer 113 secured thereto by rivets or the like passing through ring 113' against which flat springs 114 bear, so as to force the cup leather to seal the joint. The same construction is used on the gear wheel 10 side of the cam shaft.

Figure 13:
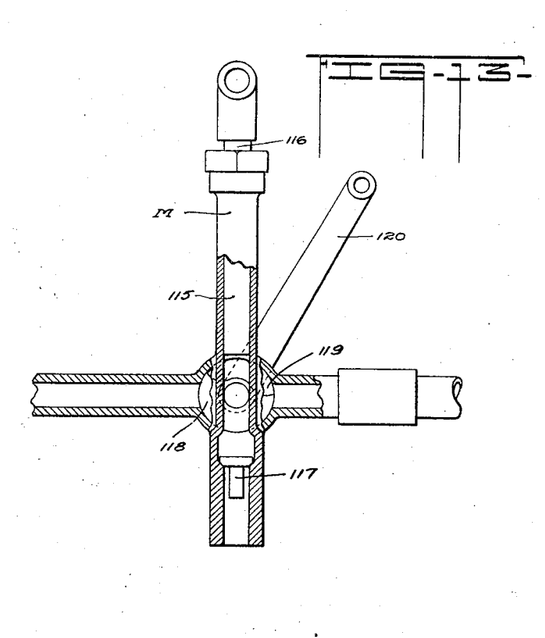
Figs. 13 and 14 are detailed sectional views at right-angles to each other of the water pump.
Figure 14:
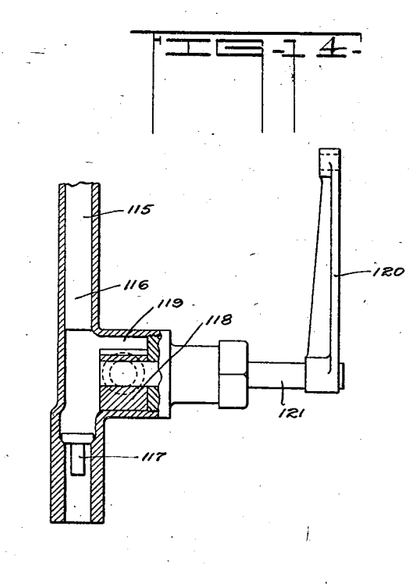

The water pump M is shown in detail in Figs. 13 and 14 and includes the cylinder 115, piston 116, lift valve 117 and rotary valve 118 mounted in chamber 119 and rotated by lever 120 on shaft 121 by means of link 122 which is connected to lever 26 (Fig. 1), so as to regulate the amount of water pumped into the boiler A or back to the source of supply. The piston 116 is reciprocated by the eccentric link connection 123 with gear 14 (Fig. 3). It is to be understood that the pump is continuously operated when the engine is running and that the valve 118 is positioned so that there is always a small quantity of water being supplied to the bottom of the boiler or other heater, so as to prevent the sudden cooling of the water in the system by the abrupt admission of a comparatively large quantity of cold water.

It is to be understood that while I show the air valve H as an automatic valve, I may use a positively operated mechanical valve instead, and also that while I have described the admission of air only through said valve that gas or a mixture of air and gas may be admitted therethrough and passed into the engine. A gage 130 or other means is provided so that pressure may be determined and a spark plug 131 or other means for positive ignition is used in case automatic ignition is not desirable.

What I claim is:—

1. An engine comprising a cylinder, a piston therein, a crank shaft connected to the piston, a cam shaft operable by the crank shaft, an air tight crank case inclosing the crank shaft, an air inlet for the cylinder, an automatic valve connected to the crank case and operable by pressure therein to admit air into said case and also open communication with the air inlet, a normally closed valve in the latter, and means operable by the cam shaft for opening the second valve after a plurality of charges of air has been admitted to the air inlet by the automatic valve.

2. In an internal combustion engine, a cylinder and piston operable therein, means for supplying a charge of combustible gas to the cylinder for certain power strokes of the piston, means for supplying a charge of hot water into the cylinder for certain other power strokes of the piston which alternate with the intervals during which the gas is supplied, and means for supplying a scavenging charge of air to the cylinder between the charges of gas and hot water whereby the saturated atmosphere within the cylinder will be exhausted prior to a succeeding charge of gas.

3. In an internal combustion engine, a cylinder and piston operable therein, means for supplying a charge of combustible gas to the cylinder for certain power strokes of the piston, means for supplying a charge of hot water into the cylinder for certain other power strokes of the piston which alternate with the intervals during which the gas is supplied, said charges being delivered at the start of the power strokes, and means for supplying a scavenging charge of air to the cylinder at the end of certain power strokes and between the charges of gas and hot water whereby the saturated atmosphere within the cylinder will be exhausted prior to a succeeding charge of gas.

4. In an internal combustion engine, a cylinder and piston operable therein, means for supplying a charge of combustible gas to the cylinder for certain power strokes of the piston, means for supplying a charge of hot water into the cylinder for certain other power strokes of the piston which alternate with the intervals during which the gas is supplied, means for supplying a scavenging charge of air to the cylinder between the charges of gas and hot water whereby the saturated atmosphere within the cylinder will be exhausted prior to a succeeding charge of gas, an air storage chamber, means for supplying air to the chamber on each power stroke of the piston, and valve means operable only on certain power strokes of the piston to release the air from the chamber to said means for supplying the scavenging air to the cylinder.

5. A mechanism of the character described, including in combination, a cylinder, an air tight crank case connected thereto, a piston, connecting rod, crank shaft, cam shaft, said shafts being journaled in bearings in said crank case having air-tight joints, an air compressor, said cylinder having a water jacket, and water circulating system connected to the jacket and including a tank, a pump and a heater, an automatic means for controlling the amount of water in the system, an exhaust valve for the cylinder, a connection leading from the exhaust valve to said heater so that the temperature of the water is raised by the heat of the exhaust gases and products of combustion, an injector for supplying alternate charges of fuel and hot water under pressure into said cylinder, and means for admitting the hot water to the cylinder on the in-stroke of the piston whereby a low pressure will be provided within the cylinder so that the hot water instantly expands or explodes into steam, means for admitting air into said cylinder at or near the completion of the steam power or instroke of the piston to clear the cylinder of the residue of water vapor and to provide a charge of air for compression on the outstroke of the piston; a thermostat for controlling the quantity of hot water injected into the cylinder, a governor for controlling the amount of the fuel injected into the cylinder, and connections from said air compressor to said injector so that a supply of compressed air is delivered thereto for atomizing the fuel and hot water and forcing the same into the cylinder under pressure.

6. A mechanism of the character described, including in combination, a cylinder, an air-tight crank-case connected thereto, a piston, connecting rod, crank shaft, cam shaft, bearings for said shafts in said crank case having air-tight packing rings, a valve for controlling the intake and discharge of a compressible fluid into and out of said crank case, the piston functioning as an air pump for the crank case, said cylinder having a water jacket, a boiler, a tank, all connected together so that water circulates therethrough on a thermosiphon principle, a water pump, means for controlling the amount of water supplied to the system, an exhaust valve for the cylinder having a connection with said boiler so that the hot exhaust gases pass through the boiler, an injector connected to the water system to supply hot water to the cylinder for every alternate power stroke and fuel for every other alternate stroke, means for making a connection to a source of gas supply in case liquid fuel is not used, means for affording positive ignition where automatic ignition through high compression is not used, a thermostat for controlling the amount of water introduced into the cylinder and means for controlling the amount of fuel introduced.

GEORGE W. SWARTZ.